United States Patent [19]
Appel et al.

[11] Patent Number: 4,935,953
[45] Date of Patent: Jun. 19, 1990

[54] CYCLIC VIDEO REGION TRANSMISSION FOR VIDEOCONFERENCING SYSTEMS

[75] Inventors: Arthur Appel, Yorktown Heights; Miriam Zohar, Shrub Oak, both of N.Y.

[73] Assignee: International Business Machines Corporation, Armonk, N.Y.

[21] Appl. No.: 344,180

[22] Filed: Apr. 27, 1989

[51] Int. Cl.⁵ .................... H04M 11/00; H04N 7/12; H04N 7/14
[52] U.S. Cl. ........................ 379/53; 358/85; 358/133
[58] Field of Search ............... 379/53, 54; 358/85, 358/133

[56] References Cited

U.S. PATENT DOCUMENTS

| | | | |
|---|---|---|---|
| 4,494,144 | 1/1985 | Brown | 358/133 |
| 4,598,372 | 7/1986 | McRoberts | 358/133 X |
| 4,633,296 | 12/1986 | Cham et al. | 358/133 X |
| 4,656,511 | 4/1987 | Koga | 358/136 |
| 4,686,698 | 8/1987 | Tompkins et al. | 379/53 |
| 4,695,883 | 9/1987 | Chandler et al. | 358/85 X |

FOREIGN PATENT DOCUMENTS

8604757  8/1986  PCT Int'l Appl. .

*Primary Examiner*—Keith E. George
*Attorney, Agent, or Firm*—Ratner & Prestia

[57] ABSTRACT

A system for full motion videoconferencing. The total video image space is broken down into regions of such position and size relative to the space that the image data in predetermined sections of the regions is overlapped during the cyclic transmission thereof. The reception and display of the superimposed regions provides a significant increase in the perceived transmission rate in the overlapped sections, rendering those sections suitable for full motion effects.

10 Claims, 7 Drawing Sheets

CYCLIC VIDEO REGION TRANSMISSION FOR VIDEOCONFERENCING SYSTEMS

BACKGROUND OF THE INVENTION

Videoconferencing in which video images are sent at high speed over telephone lines or computer networks has assumed increasing importance as an area of computer communications.

The combination of video and telephone communication dates back approximately two decades to the introduction of the "Picturephone" by the American Telephone and Telegraph Company. The system was unsuccessful primarily because its required bandwidth was equivalent to hundreds of long distance connections and the increased numbers of communication wires could not be accommodated by all switching systems at that time.

Compression of the video signal to reduce the quantity of the video information that is transmitted without loss of information and the subsequent recovery of the video signal from its compressed form has enabled the utilization of existing telephone networks. However, the high cost of a compression computer, coupled with the fee for leasing telephone lines, have made the use of such systems prohibitive for such applications as small group or individual conversations, classes, remote educational or commercial demonstrations or the monitoring of physical equipment.

The advantages of videoconferencing are obvious. Significant reductions in travel time and expense are achieved as individuals remain at their locations. Internal specialist consultation and the closer coordination of all components of an industrial enterprise are readily achieved. What is desired is a videoconferencing system of such low cost that it might be deployed on an individualized basis, such as from office to office. The ongoing improvement in workstation communication speed and connectivity has, in fact, opened the possibility of real time videoconferencing between individual offices.

A desirable feature of videoconferencing is real time continuous motion where moving lips, changing facial expression, and pointing fingers are instantly perceived. The present invention is directed toward the latter goal by providing for full motion videoconferencing in a preselected image area of prime interest, such as the center portion of the transmitted video image.

BRIEF SUMMARY OF THE INVENTION

In accordance with the present invention, the rapid transmission of video images required in full motion videoconferencing systems is achieved for a predetermined area of the video image which is of prime interest. More specifically, the transmission rate is significantly increased, for example, approximately doubled, in the predetermined area. This permits motion, such as the moving mouth of a speaker, to be perceived by the viewer.

The present invention is directed to a method and apparatus for video communication which includes a camera and means for communicating image date corresponding to successive regions of the scanned image. The successive regions are chosen such that they have overlapping areas. Further, means are provided for receiving and displaying the image. The data corresponding to the overlapped areas is communicated, received and displayed at a greater rate than the data corresponding to non-overlapped areas. The overlap is the greatest in the aforementioned area of prime interest resulting in the maximum data rate and concomitant permissible motion in that area.

In implementing the present invention, video communication between the source and the receiver typically utilizes data packets in a high speed token ring network. In such an environment, the invention may be easily installed in a workstation and uses the same communication protocols as those for the usual workstation application. The cost of such modification to the workstation is modest in comparison to that of other present day video conferencing systems.

Other features and advantages of the present invention will become apparent in the detailed description of the system which follows.

DESCRIPTION OF THE PREFERRED EMBODIMENT

Figure 1:
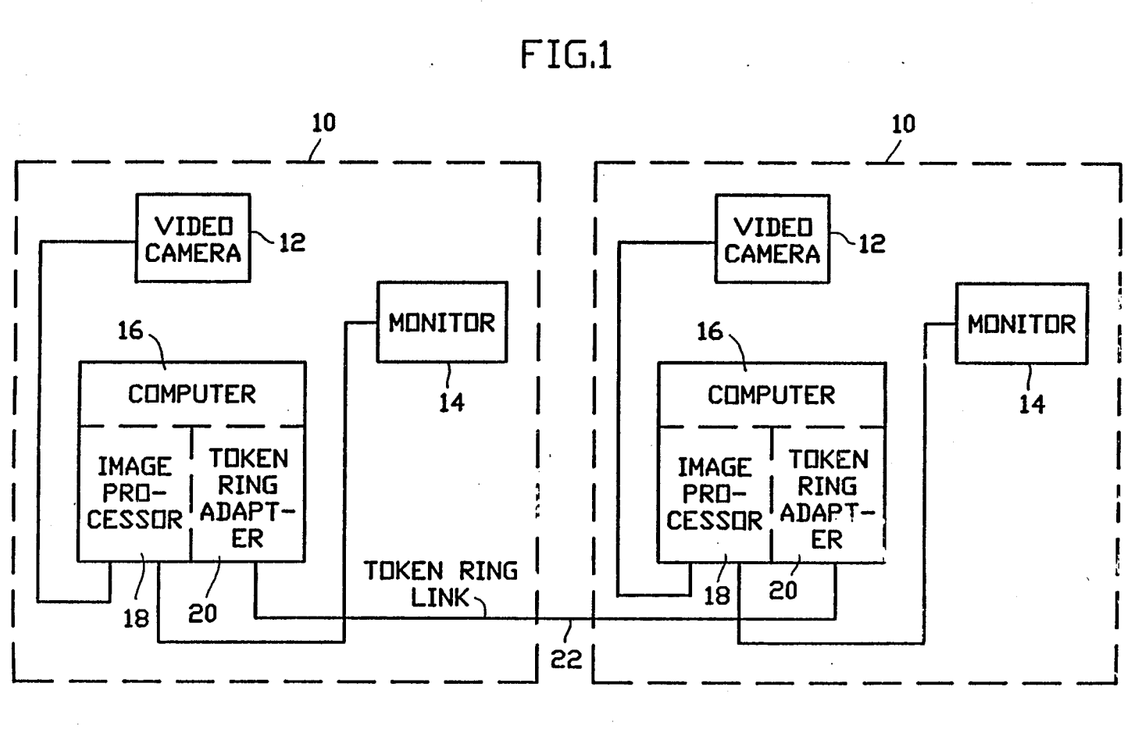
FIG. 1 is a block diagram of the physical arrangement of a video conferencing system in which the present invention may be advantageously employed.

With reference to FIG. 1, there is illustrated in simplified form a two station video conferencing network. Each station 10 comprises commercially available equipment, namely, a video camera 12 and monitor 14, a desk-top computer 16 such as the IBM PC/AT, modified to include an image processor 18, and IBM Token-Ring Adapter 20, and a connection to an IBM Token-Ring communications link 22. The present invention provides within such a network, a technique for giving the impression of faster image updates in a preselected area of the video image space. Such rapid updates enable full motion effects and thereby a more lifelike image.

An image processor 18 which was found to be suitable for the network of FIG. 1 is the FG-100-AT which is manufactured by Imaging Technology Incorporated. This processor is comprised of a single board real time processor with a variety of register control functions. Such functions include input camera selection, zoom (pixel size) selection, look-up table selection, memory space specification, timing and synchronization control, on-board image processing functions, and good 8-bit accuracy.

With continued reference to FIG. 1, the image received by the video camera 12 is continuously digitized by the image processor 18, the image data is read, and the data is organized into communications packets 24 (FIG. 2) and sent via the token-ring adapter 20 over the token-ring link 22 to the receiving station. The receiving station receives the packetized data and stores it in the memory of computer 16 from which it is read into the video memory of the image processor 18. The output of the processor is subsequently displayed on the monitor 14. The image processor 18 always shows the current video memory, that is, whatever is active determines what the video monitor 14 displays. The auto-increment, read/write function of the image processor 18 is utilized to fetch video data and to input such data at reasonably high speed into video memory. If the image processor is set into the auto function, specification of address locations is not necessary since the image processor itself will automatically update the address once a start address is given.

As to the token-ring link 22, the software employs the User Datagram Protocols (UDP) of Transition Control Protocol/Internet Protocol (TCP/IP), in which receipt acknowledgments are not returned to the sender, thereby reducing the network overhead.

Figure 2:
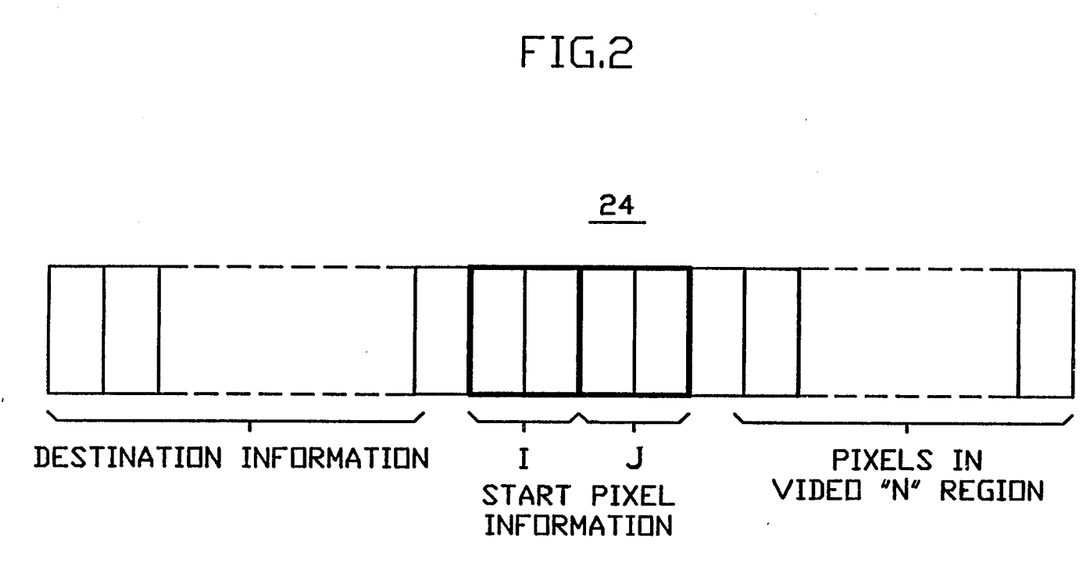
FIG. 2 depicts, in diagrammatic fashion, the physical organization of a data packet representing the video image of a region within the total image space.

As mentioned hereinbefore, the image data is organized into communication packets. The packet size is set to the maximum allowed, which in an actual operative system is 2K bytes. As seen in FIG. 2, each packet 24 includes destination information, a header which is the I,J location of the start of the pixel information data contained in the packet, and all of the pixels in a predetermined region of the total video image space. This I,J location is used to calculate the video memory location for the auto-increment write mode of the image processor 18. By this means, if any packet is lost, or if packets become disorganized, the data will still be placed in the correct location. The contiguous rectangular blocks which comprise the packet 24 in FIG. 2, each represent a byte of information. Thus, two bytes are used for each of the I,J coordinates representing the start pixel information, and each of the pixels in the "N" regions being transmitted is represented by a number which is proportional to the light intensity at that location in a black and white transmission. It should be noted that the number may be utilized in connection with a color look-up table for color transmission.

The mode of image acquisition utilized in the image processor 18 involves continuous capture at the rate of 30 images per second. Menu selection in the image processor permits a choice of resolution or zoom mode, and receive or send mode. Automatic communications and video board initialization software provides for the set-up operation and open communication over the token-ring 22 in the conventional manner.

In actual operation of the network of FIG. 1, utilizing a resolution of 120×126 pixels, the image transmission and reception yields approximately nine complete image updates a second. This parameter corresponds to a token-ring communication rate of about 140K bytes a second. In order to provide for full motion video conferencing, the perceived transmission rate should be approximately double, that is, in the order of 18 complete image updates per second. Since this transmission rate is not possible in the network of FIG. 1 because of the time consumed in video memory access, and because there is insufficient time for external video compression, the present invention, as described hereinafter, provides a convenient, low cost means of increasing the image updates.

Figure 3:
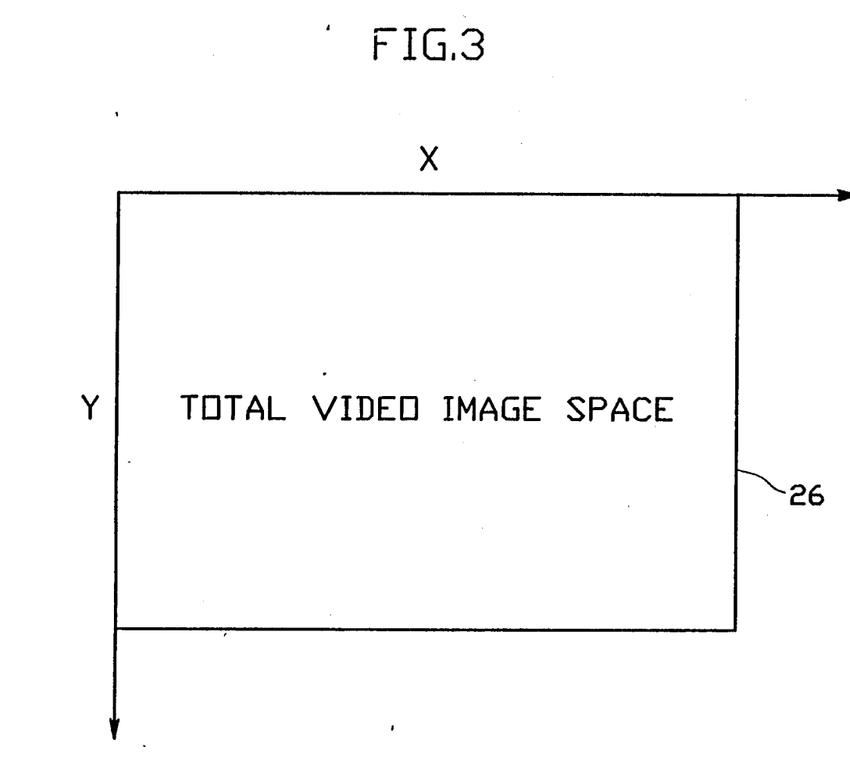
FIG. 3 represents a typical total video image space in terms of the pixels of which it is comprised.

FIG. 3 depicts the total image space 26 as seen by the video camera 12 and is comprised of X×Y pixels. For example, if X=512 and Y=480 pixels, there are a total of 245,760 pixels for the image space.

In FIGS. 4A-4D, the image space 26 of FIG. 3 is broken down respectively into four "N" regions designated 1, 2, 3, and 4. Each region abuts a corner of the image space 26 and each is typically dimensioned NX, the number of pixels in the X-direction, by NY, the number of pixels in the Y direction. In the present example, chosen for purposes of description, each region is typically half the size in pixels of the total video space 26. Thus, each region comprises 320×384 pixels or 122,880 pixels.

Figure 4A:
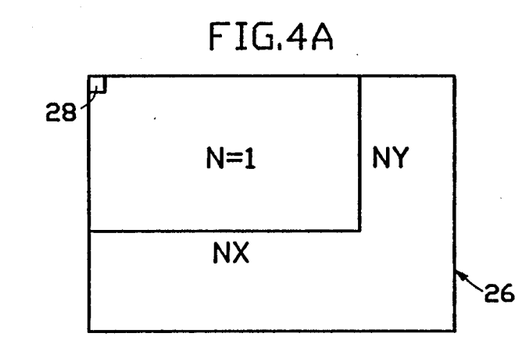
FIGS. 4A–4D, inclusive, illustrate respectively four regions derived from the video image space of FIG. 3 to be transmitted, received and displayed in accordance with the present invention.
Figure 4B:
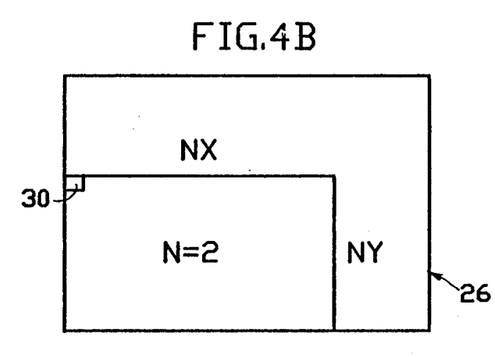
Figure 4C:
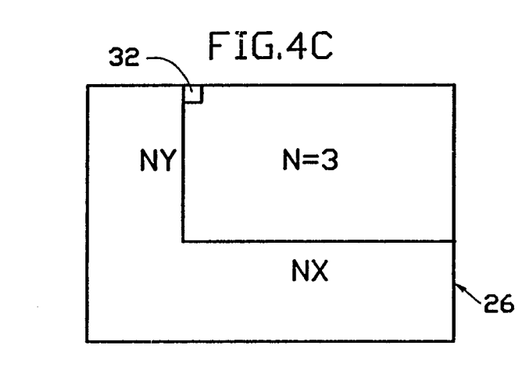
Figure 4D:
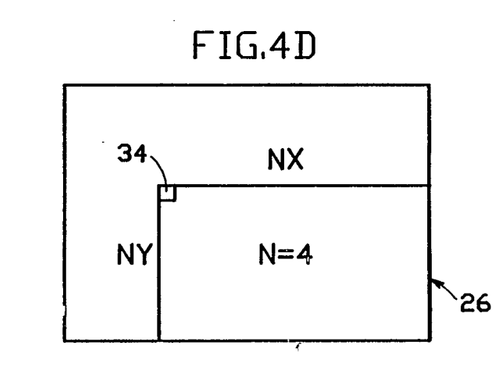

In FIG. 4A, the region N=1 appears in the upper left corner of the total video image 26. Assuming that the X and Y dimensions of the total video image are 512 and 480 pixels respectively, and that the NX and NY dimensions of the region are 384 and 320 respectively, the I,J coordinates of the start pixel 28 are 0,0. In FIG. 4B, the region N=2 appears at the lower left corner. The I,J coordinates of the start pixel 30 are 0,160. In FIG. 4C, the region N=3 is at the upper right corner of the total video image 26, and the I,J coordinates of the start pixel 32 are 128.0. In FIG. 4D, the region N=4 appears at the lower right corner, and the I,J coordinates of the start pixel 34 are 128,160.

Figure 5:
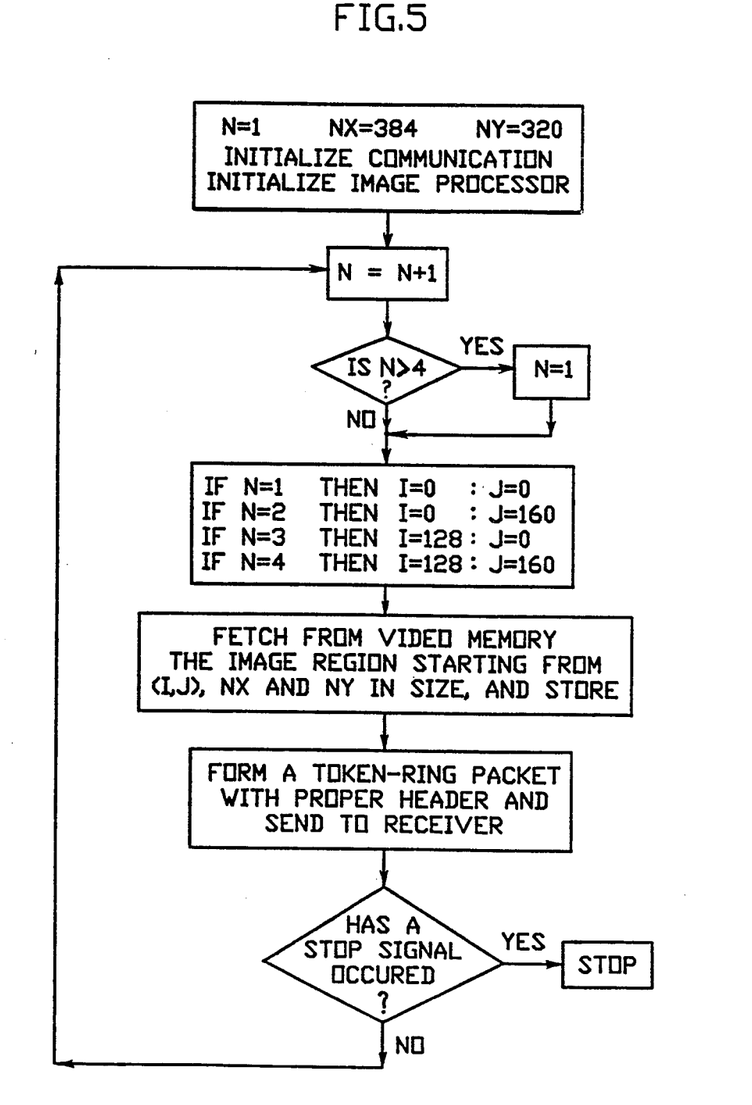
FIG. 5 is a flow chart depicting the cyclic video transmission of the regions of FIGS. 4A–4D to a receiving station.

The four "N" regions 1, 2, 3, and 4 are transmitted cyclically from one station in the network to another in accordance with the flow chart of FIG. 5. Thus, after initialization, the image data of the particular region to be transmitted, commencing with its designated start pixel, is fetched from the video memory of the processor 18 and is stored in the computer 16. The image data is then organized into a token-ring packet 24 (FIG. 2) with the proper header, as indicated hereinbefore, and is sent to the receiving station. If no stop signal, originating for example, as a keyboard interrupt or a communication system command, is received, the succeeding region of the video image is transmitted in like manner.

Figure 6:
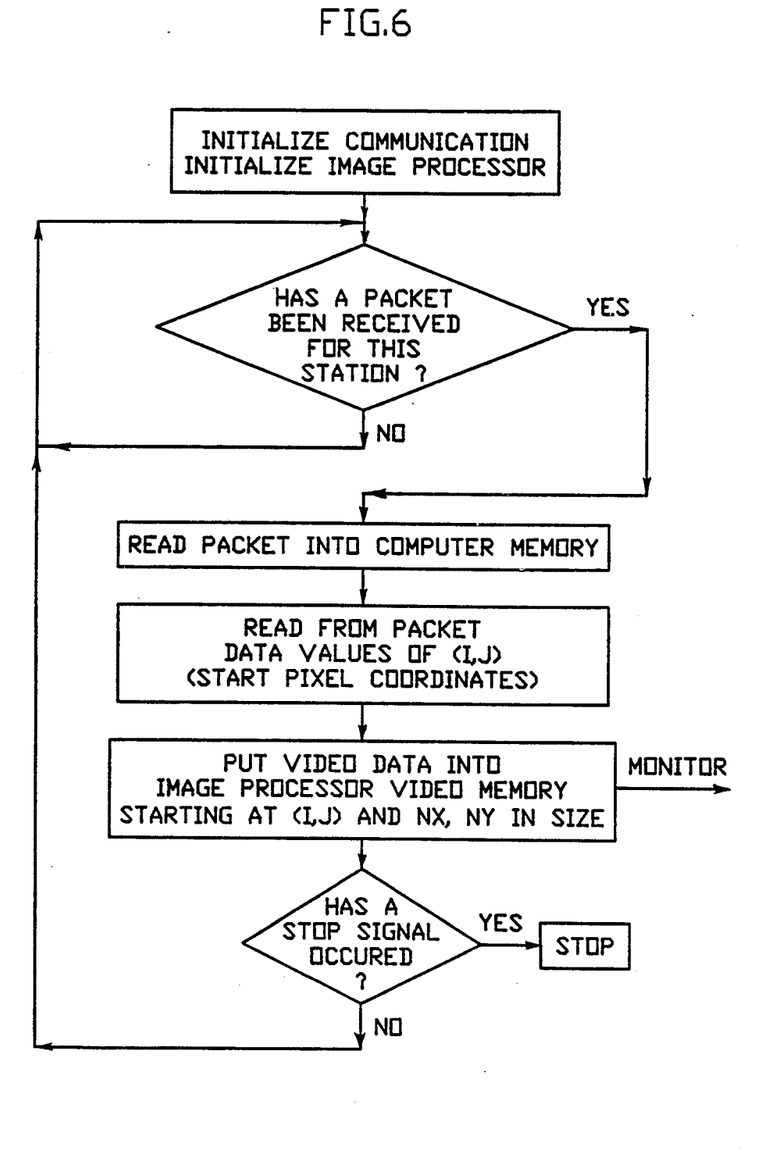
FIG. 6 is a flow chart depicting the reception by the receiving station of the cyclic video transmissions in accordance with FIG. 5.

The flow chart of FIG. 6 indicates the succession of events which takes place in the receiving station. Thus, after initialization, the packet 24 received by the station is read into the computer memory and the packet data values of the I,J start pixel coordinates are read out. The video data from the packet is placed into the image processor video memory, commencing with the start pixel and conforming to the predetermined size of the "N" region image. The images of successive regions are then displayed on a suitable monitor 14. It is apparent that the aforementioned cyclic transmission of regions of the total image space is readily accomplished in the network of FIG. 1, because the header associated with each packet enables random positioning of the data into or out of video memory.

Figure 7:
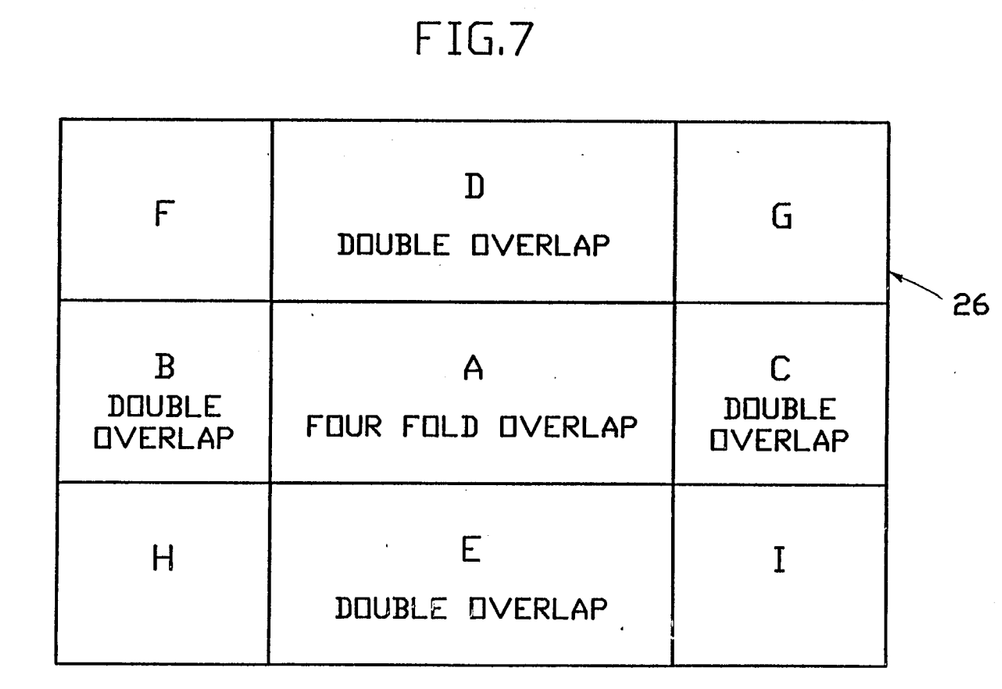
FIG. 7 illustrates the overlap of the regions of FIGS. 4A–4D when the latter are properly displayed in a video cycle.

As seen in FIG. 7, an overlap of the images of the regions in FIGS. 4A-4D occurs. For example, in central section A of the image space 26, portions of "N" regions 1, 2, 3, and 4 are superimposed such that a four-fold overlap is created. This translates to an image update of double the normal rate. In the present embodiment, this central section comprises one-sixth of the total image space, or 40,960 pixels. The middle sections 26 adjacent the sides, namely, B and C and top and bottom, that is, D and E of the image space 26 are double overlapped and hence are updated at the normal rate. Section B is formed by superimposed portions of "N" regions 1 and 2 (FIGS. 4A and 4B); section C, by regions 3 and 4 (FIGS. 4C and 4D); section D, by regions 1 and 3 (FIGS. 4A and 4C); section E, by regions 2 and 4 (FIGS. 4B and 4D). The total area encompassed by the middle sections is half the total image space, or 122,880 pixels. The corner sections, namely, F, G, H and I, which comprise one third of the total image space or 81,920 pixels, are not overlapped and are updated at half the rate. Section F is an image portion of "N" region 1 (FIG. 4A); G, a portion of region 3 (FIG. 4C); H, a portion of region 2 (FIG. 4B); and I, a portion of region 4 (FIG. 4D).

The central section which is updated at approximately twice the normal rate is generally the area of particular interest. Thus, during videoconferencing, the movement of the speaker's mouth, or the pointing of his fingers, or other details, will appear with a smooth motion in this area. It is apparent that such smoothness will not be present in the corner sections F, G, H and I of the image space 26 where there is no image overlap, but experience has shown that, in general, very little of interest happens in the corners and the human eye usually focuses on the center section A of image space.

It has been noted that in an actual operative system, the image update in the central section A, is somewhat greater than double the normal rate. This is related to the token-ring packet construction. For example, packet transmission has been found to be optimum when the packet size is greatest and when the packets 24 are completely filled.

It is apparent from the foregoing that the refresh of the video image is concentrated where it is most needed, in the area of probable greatest change and perceptual attention. While the regions selected for cyclic transmission have been described as having rectangular shape, occupying specific positions, and being approximately half of the total image space, it should be understood that these parameters have been chosen solely for purposes of example and the invention should not be construed as being so limited. For example, the size of the overlap regions may be adjusted for more or less overlap. The total number of overlap regions may be changed for different token-ring operations or maximum token-ring packet size. Additionally, it is possible to move the regions of overlap for different situations in accordance with the user's desire. Thus, regional update priorities determine where the perceived transmission rate is to be increased. In addition to videoconferencing, the present invention finds application in such diverse activities as continuous parts inspection, object recognition and robotics.

The invention claimed is:

1. A videoconferencing system providing full motion in an image area of prime interest comprising:
    means for generating image data corresponding to a total image space,
    means coupled to said generating means for communicating portions of said image data corresponding respectively to successive regions within said total image space, said regions having both overlapped sections and non-overlapped sections when superimposed on one another,
    means for receiving said portions of said image data, said overlapped sections of said regions having a perceived communication rate greater than that for said non-overlapped sections,
    said image area of prime interest being defined by predetermined overlapped sections of said regions.

2. A videoconferencing system as defined in claim 1 wherein said means for generating image data corresponding to a total image space comprises imaging means for converting said image space to electrical signals and image processor means coupled to said imaging means for digitizing said signals to provide said image data.

3. A videoconferencing system as defined in claim 2 wherein said means for communicating said image data corresponding respectively to successive regions within said total image space comprises computer means coupled to said image processor means for storing said image data and a token-ring coupling said computer means to said receiving means.

4. A videoconferencing system as defined in claim 3 characterized in that said image data stored in said computer is organized into respective packets for said regions within said total image space, said packets being communicated by said token-ring.

5. A videoconferencing system as defined in claim 4 further characterized in that each of said packets comprises destination information, a header defining the location of a particular region within said total image space and data for all of the digitized signals of which said particular region is comprised.

6. A videoconferencing system as defined in claim 5 wherein said respective packets for successive regions are communicated to said receiving means in a cyclic manner.

7. A videoconferencing system as defined in claim 6 wherein said receiving means includes computer means for receiving said packets, said header of each of said packets being read out to establish the position of the particular region corresponding to said packet relative to said total image space, image processor means coupled to said last mentioned computer means, said image processor means including memory means for storing said header information and the digitized signals for said particular region.

8. A videoconferencing system as defined in claim 7 further including display means coupled to said image processor means in said receiving means, whereby the cyclic presentation of successive regions of said total image space results in more continuous full motion within said image area of prime interest.

9. A videoconferencing system as defined in claim 8 wherein said total image space is rectangular in form and is comprised of a predetermined number of pixels, each of said regions being rectangular in form and being comprised of substantially half the number of pixels in said total image space, said regions occupying respective corners of said total image space such that the superimposition of said regions on said total image space during the cyclic communication thereof, creates a central section having a four-fold overlap, middle sections adjacent the sides and top and bottom of said total image space having a double overlap and corner sections having no overlap, said central section being coextensive with said image area of prime interest.

10. A method of increasing the perceived transmission rate of video images in an area of prime interest comprising the steps of:
    (a) scanning a total image space and generating image data corresponding to said space;
    (b) cyclically communicating portions of said image data corresponding respectively to successive regions within said total image space wherein said regions have overlapped and non-overlapped sections;
    (c) receiving said portions of said image data; and
    (d) displaying the received portions of said image data wherein the video images displayed in predetermined sections of said regions exhibit the characteristics of an increased transmission rate relative to the images in non-overlapped sections.

* * * * *